Aug. 8, 1950        F. OFFNER        2,517,702
LOCATING DEVICE

Filed Nov. 3, 1944        3 Sheets-Sheet 3

Inventor:
Franklin Offner
Pierce & Scheffler
Attorneys.

Patented Aug. 8, 1950

2,517,702

UNITED STATES PATENT OFFICE 2,517,702

LOCATING DEVICE

Franklin Offner, Chicago, Ill.

Application November 3, 1944, Serial No. 561,783

4 Claims. (Cl. 343—118)

This device relates to the location of objects by means of radiant energy, particularly infra-red radiation, emitted or reflected by the objects.

A principal purpose of the invention is the provision of a device for the location of objects.

A further purpose of the device is the provision of means for locating the direction of a source of radiant energy.

Another purpose of the invention is the provision of a device for causing radiant energy from a distant object to generate a pulsating electric current varying in phase and amplitude in dependence upon the relative direction of the object.

Another object of the invention is the provision of means for measuring the changing phase and amplitude of electric currents.

The apparatus of the invention comprises detector means, including a radiation sensitive element, for producing electric current variations in response to variations in radiation incident on the element, means for cyclically varying the incidence of radiation on the element in fixed phase relation to the direction of the source of radiation, directional indicating means responsive to the output of the detector means, and switching means for impressing the output of the detector means on the indicating means in a sense cyclically varying in synchronism with the radiation varying means.

The radiation sensitive element of the apparatus of the invention may be any of a number of known elements of this type, such as a photoelectric cell, a radio antenna, a radiation thermopile, a radiation bolometer, or the like. The thermopile and the bolometer are especially useful in locating objects by means of far infra-red radiation (heat rays).

The principles of the invention will be more particularly described with reference to apparatus including radiation bolometers as the radiation sensitive element, as shown by way of illustration in the accompanying drawings in which.

Figure 1:
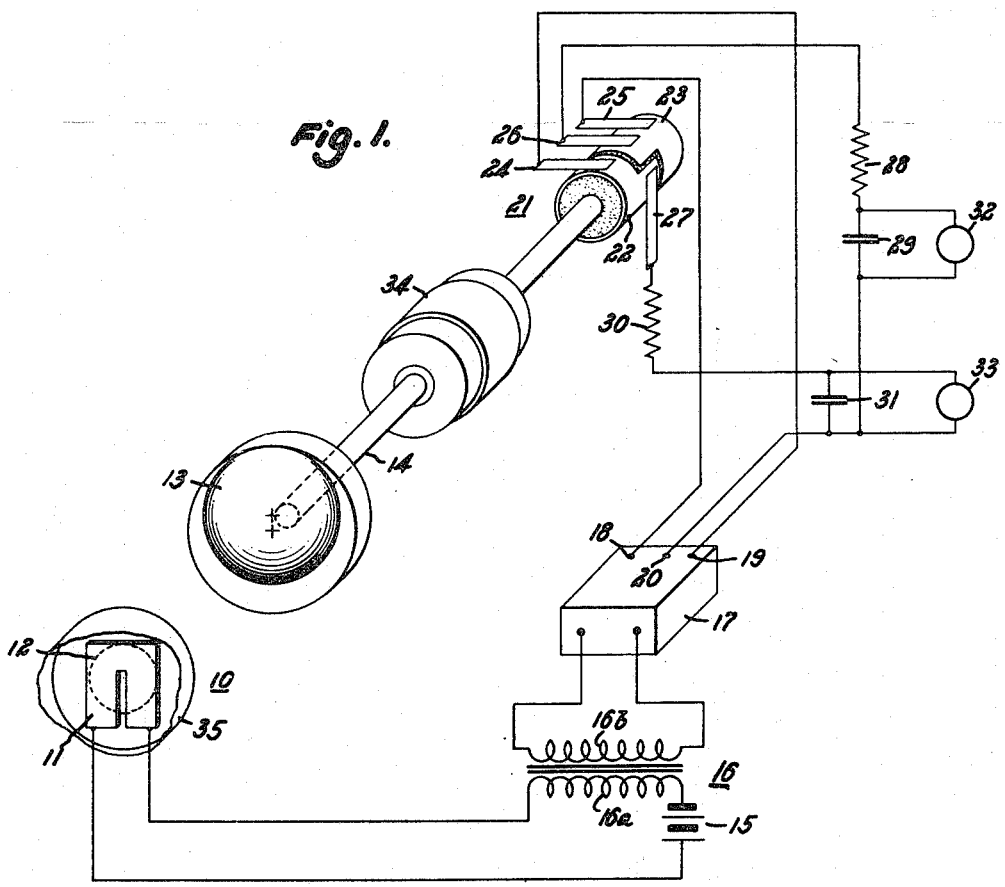
Fig. 1 is a diagrammatic representation of apparatus embodying the principles of the invention as applied to radiation bolometers.
Figure 2:
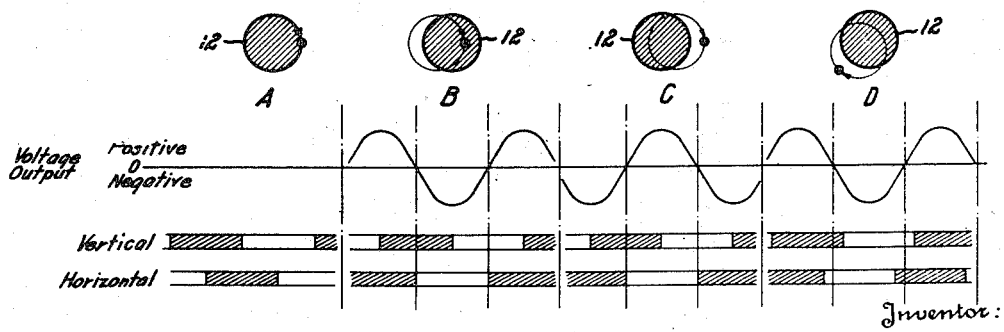
Fig. 2 is a diagram of optical and voltage patterns typical of the apparatus of Fig. 1.

In Fig. 1, 10 is a radiation bolometer typically comprising blackened thin nickel strips 11, placed behind a circular aperture 12, and mounted in case 35. When radiation falls on the strips, a temperature change will occur, which may be detected by the change in electrical resistance. The bolometer is placed at the focus of a parabolic reflector 13. The reflector is mounted on a rotating shaft 14, driven by motor 34, the bolometer being mounted axially with the shaft. The reflector is mounted slightly eccentrically on the shaft, so that as the shaft and reflector rotate the image of a distant small object lying along the axis will trace out a circular path falling on the rim of the circular aperture of the bolometer. The image of objects off the axis will then also trace nearly circular patterns, but intersecting the bolometer aperture in a phase dependent upon the direction of said object. This is illustrated in Fig. 2, wherein A illustrates the path of the image for object on axis; B, object at left; C, object at right; D, object down and left.

Current from a battery 15 is passed through the bolometer elements 11, and primary winding 16a of transformer 16. (The circuit is shown in a simplified form in Fig. 1.) As radiation falls on the bolometer, the variation in its resistance modulates the current flow, producing an amplified voltage at the secondary 16b of 16. The phase of this voltage varies directly with the phase at which the image crosses the aperture; the phase of the voltage thus determines the angular position of the object in the field. This is illustrated in Fig. 2, typical wave forms being illustrated for the various object positions shown; with the object centered, Fig. 2—A, no output voltage is (theoretically) obtained.

As the voltage obtained from the secondary of 16 may still be minute, it is amplified by electron tube amplifier 17. The output of 17 is arranged to provide symmetric positive and negative signals. That is, when output terminal 18 has ten volts positive signal with respect to neutral point 20, output terminal 19 has ten volts negative signal. The output signal is fed through a synchronous switch 21, operated by shaft 14, synchronously with the rotation of reflector 13. Switch 21 may be made in the form of a slip-ring and commutator, as illustrated. Slip-ring 22 is connected to amplifier output terminal 19 through brush 24; slip-ring 23 is connected to terminal 18 through brush 25. Half of each slip-ring is half cut away and over-lapped, to form a commutator. Brushes 26 and 27 are disposed at 90° along the commutator. Then brush 26 will be connected to terminal 18 for half of each revolution of the commutator, and to 19 for the other half. Brush 27 will be similarly connected, but will be switched in 90° rotation after 26. Each brush is connected to a resistance-capacity averaging circuit 28—29 and 30—31, and voltage measuring means 32 and 33. The action of the switching and measuring circuits is illustrated by the bars below the wave form curves of Fig. 2. The "vertical" bars refer to brush 26; the "horizontal" to 27. The shaded bars indicate that the corresponding brush is connected to terminal 18, and the white bars indicate connection to terminal 19. In Fig. 2—B, the horizontal brush is connected to terminal 18 while 18 is positive; one-half cycle later, when 18 is negative, the brush is connected to 19 which is now positive. The averaging circuit provides a relatively uniform voltage to measuring means 32; this, then, indicates a positive voltage. A positive reading on 32 thus indicates "object on left."

Observing now the voltage applied to the vertical brush 26, it is seen that half the time it is connected to 18, 18 is positive, and the other half negative; and that the average is zero, and similarly while connected to 19. Thus the average voltage measured at 33 is zero, indicating "object centered" for vertical.

With the object to the right, Fig. 2—C, a similar analysis shows 32 will give a negative indication and 33 again zero.

With the object left and down, Fig. 2—D, 32 will be positive (although it will not show maximum positive voltage), and 33 will also be positive. Thus the polarity shown by 32 and 33 will indicate the quadrant position of the object.

Voltages varying at frequencies other than synchronous with the commutator will be averaged out in a sufficient number of cycles; except that odd order harmonics of the commutator frequency will be passed, although attenuated. The averaging time of the circuit depends upon the product of resistor 28 and capacitor 29, and resistor 30 and capacitor 31. This product determines the selectivity characteristics of the circuit. The greater the product, the greater the selectivity and the greater the discrimination that the circuit will provide against undesired frequencies. This discrimination is of importance in a locating device as the limit of sensitivity is usually provided by undesired random voltages. The selectivity provided therefore reduces the effect of such undesired voltages making possible increased sensitivity.

Figure 3:
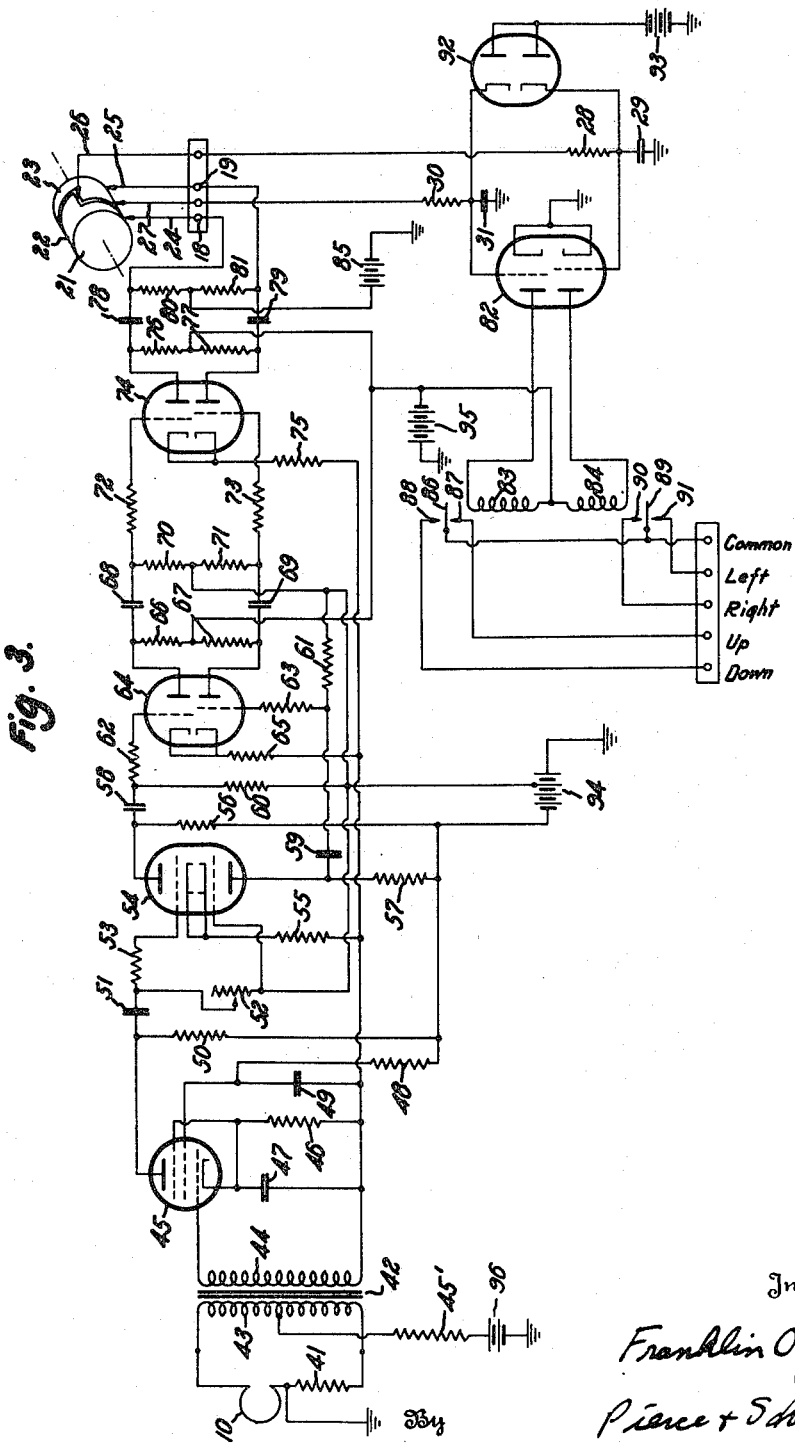
Fig. 3 is a detailed electric circuit diagram of a typical arrangement of electrical apparatus elements of the invention.

The complete electrical circuit embodying the principles of the invention is shown in Fig. 3. 10 is the bolometer, 41 is a resistor having resistance equal to the resistance of 10. These are connected across a transformer 42 having a center-tapped primary 43. The voltages for energizing 10 is introduced through the center-tap of 43, and through current limiting resistor 45′. The purpose of 41 in conjunction with the center-tapped winding 43 is to provide equal currents through both halves of 43, the net magnetic effect cancelling. This prevents saturation effects in the core of 42. The varying radiation falling on 10 as the reflector rotates causes a variation in the resistance of 10 with a consequent variation in the current through 43. This induces an increased voltage variation in the secondary winding 44; 44 having many times the number of turns of wire in 43.

The voltage produced by 44 is amplified in pentode amplifier tube 45. This has conventional cathode resistor bias 46, with by-pass condenser 47; screen resistor 48, with by-pass condenser 49; and plate load resistor 50.

The output of the first stage of amplification is coupled to the next stage by condenser 51, and grid return resistor 52. 52 is made variable for a reason to be disclosed below. The connection to the following amplifier tube 54 is made through current limiting resistor 53. The purpose of this resistor is to limit the grid current which may flow during large positive signal voltages.

54 is a dual triode. A signal is applied to the grid of only one triode, the other grid being connected to a constant voltage. A degenerative signal is produced across the common cathode resistor 55, which results in substantially equal signals being developed across each load resistor 56 and 57. It will be noted that the grid return to each triode section is made to a positive voltage; the bias developed across 55 is sufficient to provide a net negative bias to the grids. The output of this second stage of amplification is coupled into a third stage through condensers 58 and 59, followed by grid coupling resistors 60 and 61, and current limiting resistors 62 and 63. The third stage is again a dual triode 64, having a common cathode resistor 65. The plate resistors are 66 and 67. This is coupled into a fourth stage of amplification, another dual triode 74, through condensers 68, 69; grid return resistors 70, 71; and grid current limiting resistors 72, 73. 75 is a common cathode resistor; 76, 77 the plate load resistors.

The output of the final stage of amplification is coupled into the synchronous switch 21, through condensers 78, 79 and resistors 80, 81. The synchronous switch, which is shown in more detail in Fig. 1, consists of two stepped slip-rings 22, 23 mounted on, but insulated from, the shaft which carries the reflector. The brushes 24, 25, 26 and 27, as previously described, switch the output terminals 18, 19 of the amplifier, to the averaging networks 28, 29 and 30, 31. The measuring means 32 and 33 are here provided by a dual triode vacuum tube 82. In the plate circuit of one section is relay 83, and in the other section relay 84. A negative bias voltage is provided for 82 through battery 85. With this bias voltage, if a positive voltage accumulates on condenser 31, relay 83 will close contacts 86, 87, giving an up indication; if a negative accumulates on 31, the relay 83 opens, opening contact 86, 87, and closing contact 86, 88, giving a down indication. Similarly, if a positive charge accumulates on 29, contacts 89, 90 are closed by relays 84, giving a right indication, while if a negative charge accumulates on 29, contacts 89, 90 are opened and 89, 91 closed, giving a left indication.

If a large positive current flows, for example, through 30 into 31, the voltage on 31 would tend to take on a large positive value. It is, however, limited by the grid current of 82 to a voltage (as measured from the negative end of 85) approximately equal to the voltage of 85. The double diode 92 is provided to limit the maximum negative voltage which may be accumulated by 29 and 31. This double diode has its plates biased negatively by 93 to an amount approximately double the bias provided by 85. Then the negative voltage accumulating on 29 or 31 cannot appreciably exceed the voltage provided by 93. The plate voltage supply of the first two stages is provided by battery 94. The plate voltage supply of the second two stages of amplification, as well as the relay tube 82, is provided by battery 95. A tap on 94 provides the positive bias voltage for 54, 64, 74. The voltage for the bolometer circuit is provided by battery 96. This battery also supplies the voltage for the heaters of vacuum tubes 45, 54, 64, 74, 82 and 92 through circuit elements, not shown. Resistor 52 is made variable to adjust the phase shift of the amplifier. Because of the thermal lag of the bolometer there will be a phase shift in the voltage developed thereby in comparison with the radiation falling thereon. The phase shift of the amplifier may be made equal and opposite thereto by adjusting 52. If the phase shift is so adjusted, the rate of change of phase shift with the speed at which the reflector is driven will be approximately equal and opposite for the amplifier and bolometer, so that the net phase shift will be approximately zero for speeds in the vicinity for which 52 is adjusted. This eliminates the need for close control of the speed of the motor, while maintaining the accuracy with which the vertical and horizontal axes are defined.

While this apparatus has been particularly described with reference to a bolometer, it may also be used with other sources of radiation. For example, in the input circuit consisting of 10, 41, 42, 43, 44, 45 of Fig. 3, the bolometer 10 may be replaced by a photoelectric cell 103, as illustrated in Fig. 4; or a thermopile 108, as illustrated in Fig. 5; or a radio receiving antenna 110, as illustrated in Fig. 6.

Figure 4:
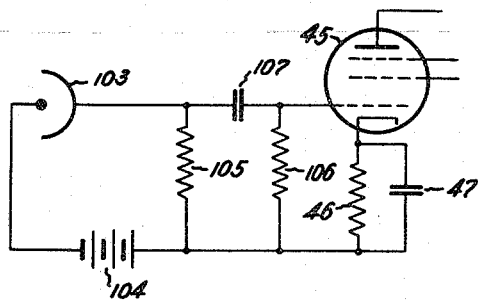
Figs. 4, 5 and 6 are partial diagrammatic representations showing the application of the invention to photoelectric cells, radiation thermopiles and radio antennae, respectively.

In Fig. 4, 104 is a photocell anode battery, 105 and 106 coupling resistors, and 107 coupling condenser.

Figure 5:
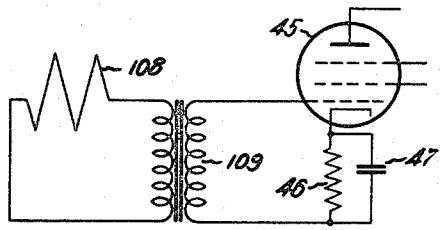

In Fig. 5, 109 is a coupling transformer.

Figure 6:
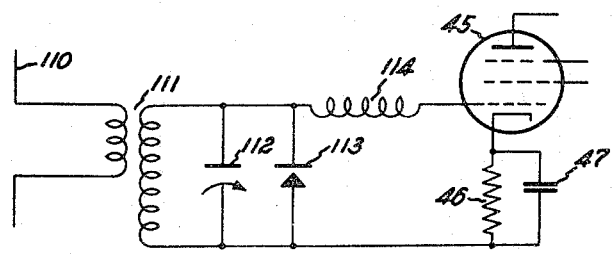

In Fig. 6, 111 is a tuned coupling transformer, 112 the tuning condenser, 113 a rectifier-detector, and 114 a radio-frequency choke coil.

The advantages discussed with respect to Figs. 1–3 would accrue in all these illustrative examples.

While the invention has been illustrated for circular scanning, it can be applied equally well to any other form of repetitive scanning pattern. For example, it may be applied to a linear scanning method wherein the reflector 13 instead of rotating eccentrically is oscillated back and forth, producing a linear scanning pattern. The synchronous switching arrangement is then synchronized with the linear oscillations of the reflector rather than with the circular oscillations as in the above description.

It will be obvious that the signals impressed on the indicating means of the invention may be utilized through current or voltage sensitive devices of known type for directional control purposes and the invention includes the apparatus defined in the claims hereof when the direction indicating signals are so utilized, in which case the response of the controlled device to the signals may be the sole directional indication.

I claim:

1. In combination, an infra-red radiation sensitive element producing electrical current variations in response to variations in incident radiation, means for cyclically varying the radiation on said element, current translating means connected to said element, switching means synchronous with said radiation varying means connected to output of said translating means, current sensitive means connected to said switching means, and means for adjusting the phase shift of said current translating means to compensate for phase shift in said sensitive element.

2. In combination, an infra-red radiation sensitive element producing electrical current variations in response to variations in incident radiation, means for cyclically varying the radiation on said element, current translating means connected to said element, said translating means providing two symmetrically varying output voltages of opposite polarity, switching means synchronous with said radiation varying means, resistance-capacity averaging means connected by said switching means to one said symmetrically varying output voltage during one-half of each cycle of radiation variation, and to the other said voltage during the opposite half of each cycle, and voltage sensitive means connected to said averaging means.

3. In combination, an infra-red radiation sensitive element producing electrical current variations in response to variations in incident radiation, means for cyclically varying the radiation on said element, current translating means connected to said element, said translating means providing two symmetrically varying output voltages of opposite polarity, switching means synchronous with said radiation varying means, resistance-capacity averaging means connected by said switching means to one said symmetrically varying output voltage during one-half of each cycle of radiation variation, and to the other said voltage during the opposite half of each cycle, voltage sensitive means connected to said averaging means, and a second averaging means connected as the first said averaging means, together with associated voltage sensitive means, switching of said second averaging means occurring at a phase displacement from switching of said first averaging means.

4. In combination, an infra-red radiation sensitive element producing electrical current variations in response to variations in incident radiation, means for cyclically varying the radiation on said element, current translating means connected to said element, said translating means providing two symmetrically varying output voltages of opposite polarity, switching means synchronous with said radiation varying means, resistance capacity averaging means connected by said switching means to one said symmetrically varying output voltage during one-half of each cycle of radiation variation, and to the other said voltage during the opposite half of each cycle, voltage sensitive means connected to said averaging means, and a second averaging means connected as the first said averaging means, together with associated voltage sensitive means, switching of said second averaging means occurring at a phase displacement of substantially 90 degrees from switching of said first averaging means.

FRANKLIN OFFNER.

REFERENCES CITED

The following references are of record in the file of this patent:

UNITED STATES PATENTS

| Number | Name | Date |
| --- | --- | --- |
| 2,130,913 | Tolson | Sept. 20, 1938 |
| 2,151,549 | Becker | Mar. 21, 1939 |
| 2,189,549 | Hershberger | Feb. 6, 1940 |
| 2,192,581 | Schulz | Mar. 5, 1940 |
| 2,216,707 | George | Oct. 1, 1940 |
| 2,226,860 | Greig | Dec. 31, 1940 |
| 2,231,929 | Lyman | Feb. 18, 1941 |
| 2,275,296 | Hagen | Mar. 2, 1942 |
| 2,334,085 | Graves et al. | Nov. 9, 1943 |
| 2,405,930 | Goldberg | Aug. 13, 1946 |
| 2,412,612 | Godet | Dec. 17, 1946 |
| 2,415,566 | Rhea | Feb. 11, 1947 |
| 2,417,112 | Kettering | Mar. 11, 1947 |
| 2,421,663 | Tonson | June 3, 1947 |
| 2,422,971 | Kell et al. | June 24, 1947 |

FOREIGN PATENTS

| Number | Country | Date |
| --- | --- | --- |
| 546,488 | Great Britain | July 16, 1942 |